(12) United States Patent
Hanya et al.

(10) Patent No.: US 7,751,152 B2
(45) Date of Patent: Jul. 6, 2010

(54) HEAD SUSPENSION

(75) Inventors: Masao Hanya, Aikoh-gun (JP); Eiji Watadani, Aikoh-gun (JP); Ichiro Takadera, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 1009 days.

(21) Appl. No.: 11/395,688

(22) Filed: Mar. 30, 2006

(65) Prior Publication Data

US 2006/0221504 A1 Oct. 5, 2006

(30) Foreign Application Priority Data

Mar. 30, 2005 (JP) .............................. 2005-099569

(51) Int. Cl.
G11B 21/21 (2006.01)
G11B 5/48 (2006.01)
G11B 5/60 (2006.01)
G11B 21/02 (2006.01)

(52) U.S. Cl. .............. 360/265.9; 360/254.3; 360/244.5; 360/244.9

(58) Field of Classification Search ... 360/244.2–245.9, 360/264.2, 265.9
See application file for complete search history.

(56) References Cited

U.S. PATENT DOCUMENTS

| 4,645,280 | A | * | 2/1987 | Gordon et al. ................. 439/77 |
| 5,081,553 | A | * | 1/1992 | Wanlass et al. ........... 360/244.9 |
| 5,299,081 | A | * | 3/1994 | Hatch et al. .............. 360/244.2 |
| 5,446,612 | A | * | 8/1995 | Thornton et al. ......... 360/244.9 |
| 5,719,727 | A | * | 2/1998 | Budde ...................... 360/244.9 |
| 5,796,554 | A | * | 8/1998 | Berding et al. ........... 360/244.8 |
| 5,877,919 | A | * | 3/1999 | Foisy et al. .............. 360/244.6 |
| 5,892,637 | A | | 4/1999 | Brooks, Jr. et al. |
| 5,912,787 | A | * | 6/1999 | Khan et al. ............... 360/245.8 |
| 5,959,806 | A | * | 9/1999 | Leung ...................... 360/244.9 |
| 5,961,334 | A | * | 10/1999 | Inaba .......................... 439/67 |
| 5,986,852 | A | * | 11/1999 | Berg et al. ................ 360/265.9 |
| 6,057,986 | A | * | 5/2000 | Takasugi .................. 360/245.9 |
| 6,172,854 | B1 | * | 1/2001 | Iwamoto ................... 360/245.9 |
| 6,288,877 | B1 | * | 9/2001 | Khan et al. ............... 360/245.9 |

(Continued)

FOREIGN PATENT DOCUMENTS

CN 1393851 1/2003

(Continued)

*Primary Examiner*—William J Klimowicz
(74) *Attorney, Agent, or Firm*—Jordan and Hamburg LLP

(57) ABSTRACT

A head suspension for a hard disk drive is thin from an arm to a head and involves a minimum step between the arm and a load beam. The head suspension includes a load beam that includes a rigid part and a resilient part. The load beam applies load onto a head that is arranged at a front end of the load beam to write and read data to and from a disk arranged in the hard disk drive. The head is connected to read/write wiring patterns of a flexure. The flexure supports the head and is attached to a disk-facing surface of the rigid part. An arm is attached to a carriage of the hard disk drive and is turned around a spindle. The arm supports the resilient part that is attached to a base end of the rigid part. A disk-facing surface of the arm is arranged within the total of thicknesses of the rigid part and head.

13 Claims, 17 Drawing Sheets

U.S. PATENT DOCUMENTS

| | | | |
|---|---|---|---|
| 6,404,595 B1 * | 6/2002 | Iwamoto | 360/245.9 |
| 6,507,459 B1 * | 1/2003 | Kamigama | 360/245.9 |
| 6,765,759 B2 | 7/2004 | Bhattacharya et al. | |
| 6,798,618 B2 | 9/2004 | Takagi et al. | |
| 7,088,554 B2 | 8/2006 | Nojima | |
| 7,088,558 B2 | 8/2006 | Takagi et al. | |
| 7,245,456 B2 * | 7/2007 | Hashi et al. | 360/244.2 |
| 7,365,945 B2 | 4/2008 | Fujimoto et al. | |
| 2001/0001587 A1 * | 5/2001 | Lee et al. | 360/245.9 |
| 2003/0179501 A1 | 9/2003 | Takagi et al. | |
| 2004/0061975 A1 | 4/2004 | Boutaghou et al. | |
| 2006/0221503 A1 | 10/2006 | Watadani et al. | |
| 2006/0221504 A1 | 10/2006 | Hanya et al. | |
| 2007/0041130 A1 | 2/2007 | Hanya et al. | |

FOREIGN PATENT DOCUMENTS

| | | | |
|---|---|---|---|
| JP | 63-58372 | | 4/1988 |
| JP | 09251741 A | * | 9/1997 |
| JP | 9-282624 | | 10/1997 |
| JP | 11086253 A | * | 3/1999 |
| JP | 11-514780 | | 12/1999 |
| JP | 2002042317 A | * | 2/2002 |
| JP | 2002-203383 | | 7/2002 |
| JP | 2005-166203 | | 6/2005 |
| WO | WO 9422137 A1 | * | 9/1994 |
| WO | WO 9927533 A1 | * | 6/1999 |

* cited by examiner

Fig.8
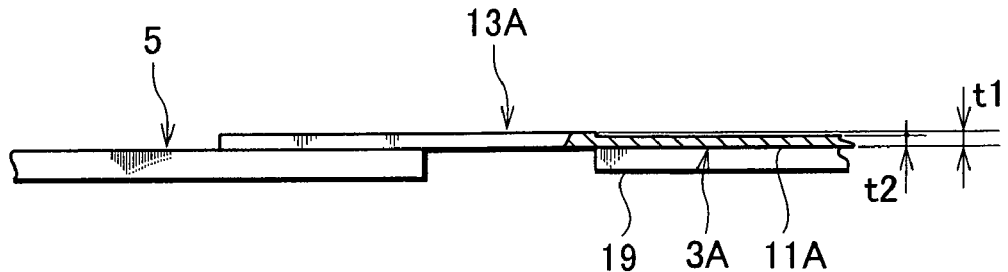
Fig.9
| Beam Thickness [um] | Hinge Thickness [um] | G Lift off [G/gf] |
|---|---|---|
| 35 | 25 | 357.2 |
| 30 | 25 | 386.0 |
| 25 | 25 | 419.1 |
| 20 | 25 | 462.3 |
Fig.10
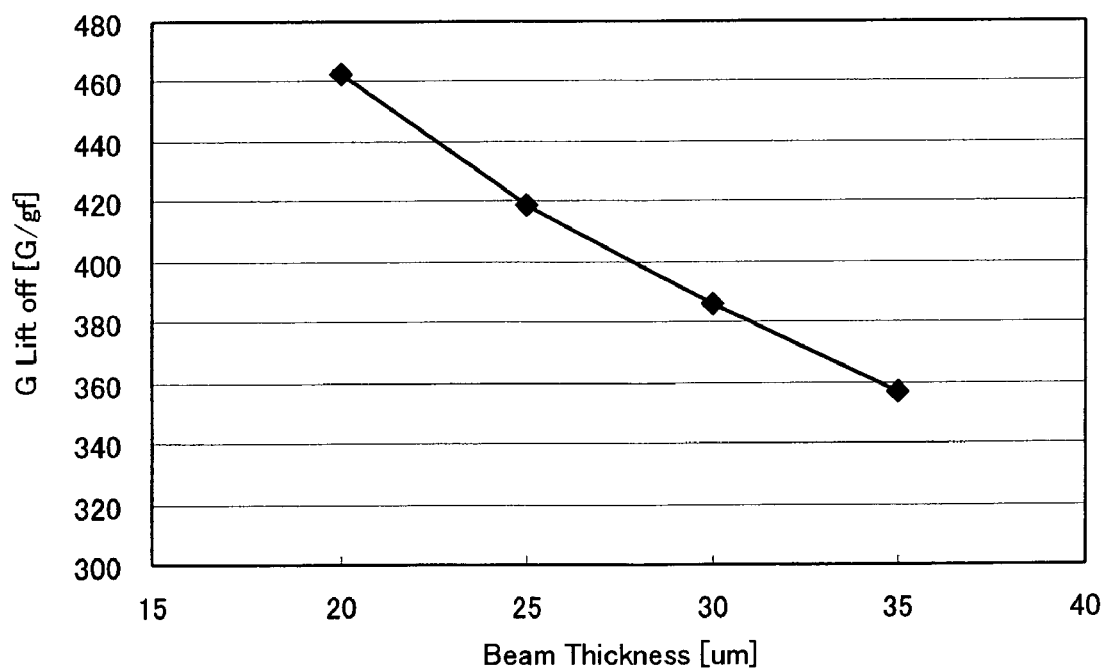

DISTRIBUTION OF LB (LB : t25um, Hinge : t25um)

Hinge Thickness : t25um

| Beam thickness | 1st Bending Freq. | | ΔB1 | G lift off | |
|---|---|---|---|---|---|
| [um] | 1 Laser Weld [ kHz ] | 2 Laser Welds [ kHz ] | [ Hz ] | 1 Laser Weld [G/gf] | 2 Laser Welds [G/gf] |
| 35 | 5.98 | 6.54 | 558 | 357.2 | 355.8 |
| 30 | 5.77 | 6.41 | 643 | 386.0 | 384.0 |
| 25 | 5.52 | 6.28 | 759 | 419.1 | 416.0 |
| 20 | 5.18 | 5.97 | 794 | 462.3 | 457.8 |

| PRESENCE OR ABSENCE OF LIFT OFF | Static G lift off 506.1G/3gf | | Static G lift off 506.1G/3gf | |
|---|---|---|---|---|
| | Loadbeam B1:3.11kHz (Short Rail Loadbeam) | | Loadbeam B1:4.02kHz (Long Rail Loadbeam) | |
| | 0.4msec | 1msec | 0.4msec | 1msec |
| No lift off | 273G | 257G 292G | 273G 301G | 273G 302G |
| Lift off at Leading side | (296G) | | →(325G) | 327G |
| Lift off | 324G | 327G | 351G | 354G |

Suspension B1:3.6kHz

HEAD SUSPENSION

BACKGROUND OF THE INVENTION

1. Field of the Invention

The present invention relates to a head suspension for a hard disk drive installed in an information processing apparatus such as a computer.

2. Description of Related Art

FIG. 26 is a perspective view showing a head suspension for a hard disk drive according to a related art. The head suspension 201 has a one-piece structure including a base plate 203 and a load beam 205 that are integrated into one piece to support a flexure 207. The load beam 205 includes a rigid part (or stiff part) 209 and a resilient part (or hinge) 211.

FIG. 27 is a sectional view partly showing an example of the hard disk drive in which the head suspension 201 of FIG. 26 is arranged. The base plate 203 of the head suspension 201 is attached to a disk-side surface of an arm 215 by, for example, swaging. The arm 215 is attached to a carriage 213.

The carriage 213 is turned around a spindle 219 by a positioning motor 217 such as a voice coil motor. By turning the carriage 213 around the spindle 219, a head 221 of the head suspension 201 is moved to a target track on a disk 223.

When the disk 223 is rotated at high speed, the head 221 slightly lifts from the surface of the disk 223 against a gram load that is a load applied to the head 221 by the head suspension 201.

In recent years, portable music players and the like employ one-inch hard disk drives. For the use with such instruments and cellular phones, miniaturized hard disk drives such as 0.85-inch and 1-inch hard disk drives are intensely developed.

The miniaturized hard disk drives for the cellular phones and the like must have not only improved environmental resistance, antishock ability, and low power consumption but also thinness thinner than the appliances themselves.

According to the structure of the related art shown in FIGS. 26 and 27, the thicknesses of the arm 215, load beam 205, flexure 207, and head 221 are added to the thickness of the disk 223. The total thickness from the arm 215 to the head 221 is difficult to reduce, and therefore, it is not easy to thin the hard disk drive.

The arm 215 and load beam 205 involves a step with respect to the disk 223. Namely, there is a difference between the center of gravity of the arm 215 and that of the load beam 205 with respect to the disk 223. Due to this difference, the arm 215 is vulnerable to torsional motion and is limited in a shock property.

The step between the arm 215 and the load beam 205 must be reduced.

Reducing the step between the arm 215 and the load beam 205, however, results in bringing the flexure 207 closer to the disk 223, particularly on the arm 215 side.

The related art mentioned above is disclosed in Japanese Unexamined Patent Application Publication No. 09-282624.

SUMMARY OF THE INVENTION

An object of the present invention is to solve the problem of a miniaturized hard disk drive that a step between an arm and a load beam cannot be cancelled without bringing a flexure closer to a disk.

In order to accomplish the object, an aspect of the present invention provides a head suspension having a load beam including a resilient part and flexure. The resilient part and flexure are fixed to the opposite-to-disk surface of the arm, so that a step between the arm and the load beam is minimized without bringing the flexure on the arm side closer to the disk. This configuration can prevent wiring patterns on the flexure from being damaged during postprocesses.

BRIEF DESCRIPTION OF THE DRAWINGS

FIG. 8 is a partly sectioned side view partly showing the head suspension of the second embodiment;

FIG. 9 is a list showing a relationship among the rigid part thickness, resilient part thickness, and shock property of a head suspension;

FIG. 10 is a graph based on the list of FIG. 9;

DETAILED DESCRIPTION OF EMBODIMENTS

Head suspensions according to embodiments of the present invention will be explained in detail. Each of the embodiments has a novelty in the arrangement of a resilient part and flexure, to minimize a step between an arm and a load beam without bringing the flexure on the arm side closer to a disk.

First Embodiment

Figure 1:
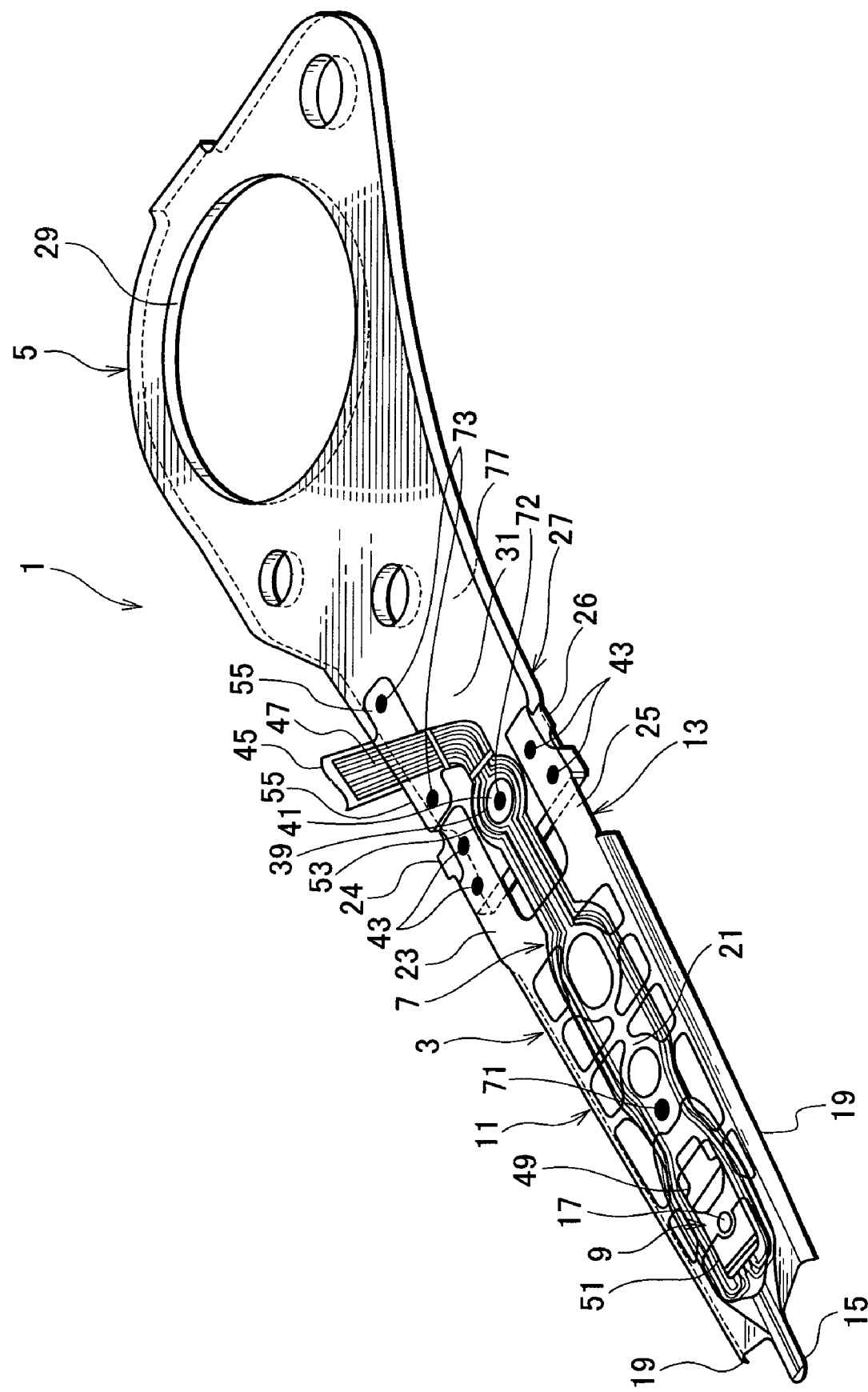
FIG. 1 is a perspective view showing a head suspension according to a first embodiment of the present invention with wiring patterns seen through a load beam.
Figure 2:
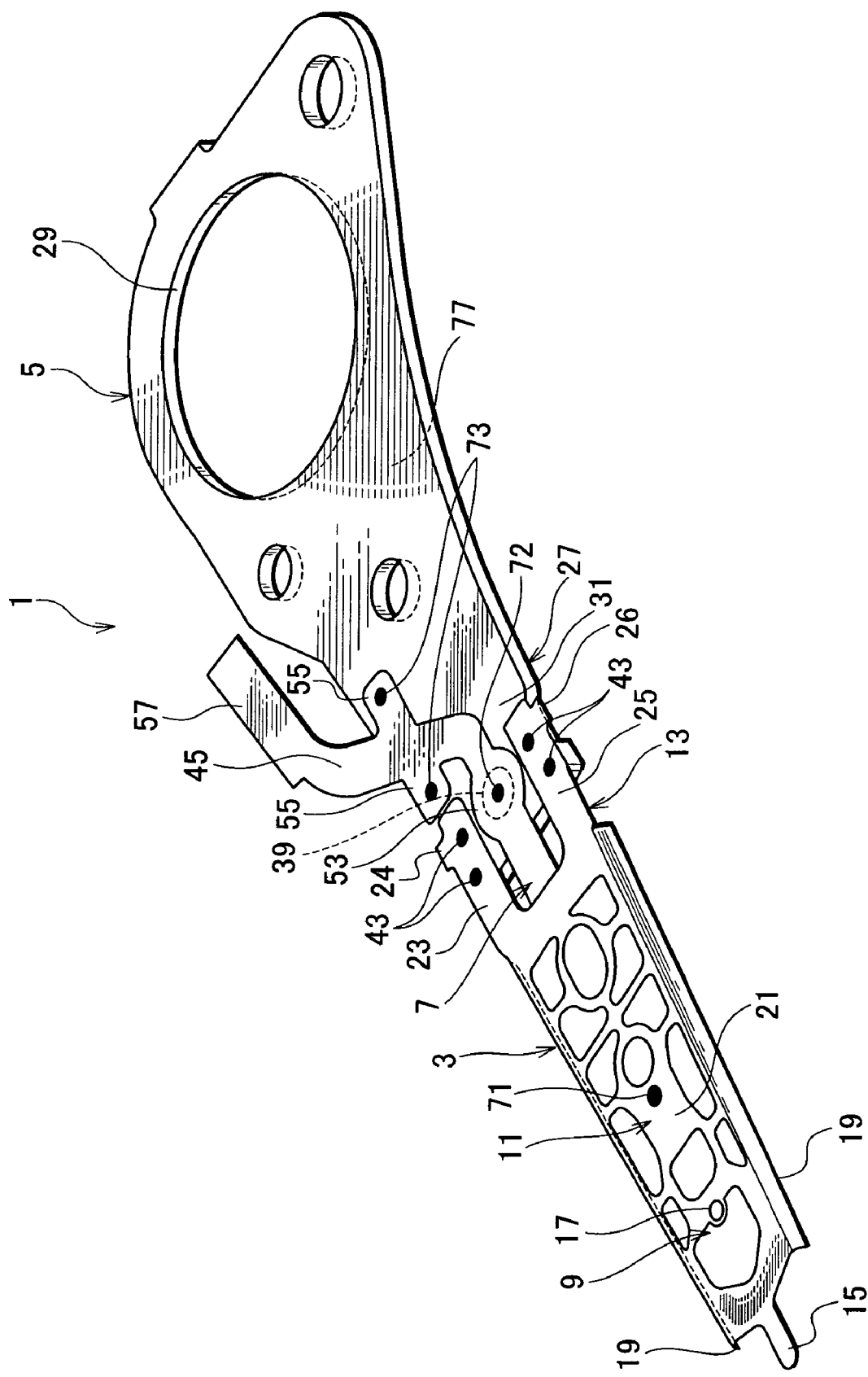
FIG. 2 is a simple perspective view showing the head suspension of the first embodiment.
Figure 3:
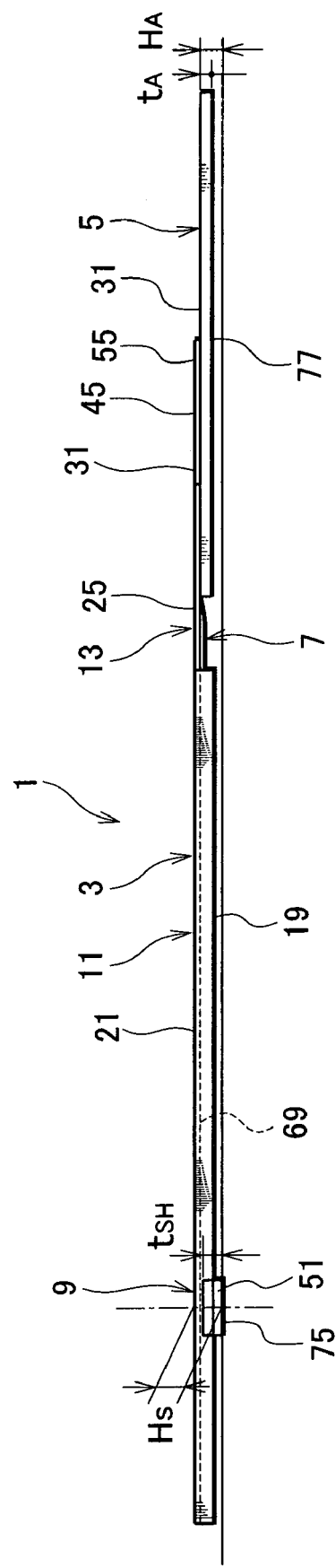
FIG. 3 is a side view showing the head suspension of the first embodiment.
Figure 4:
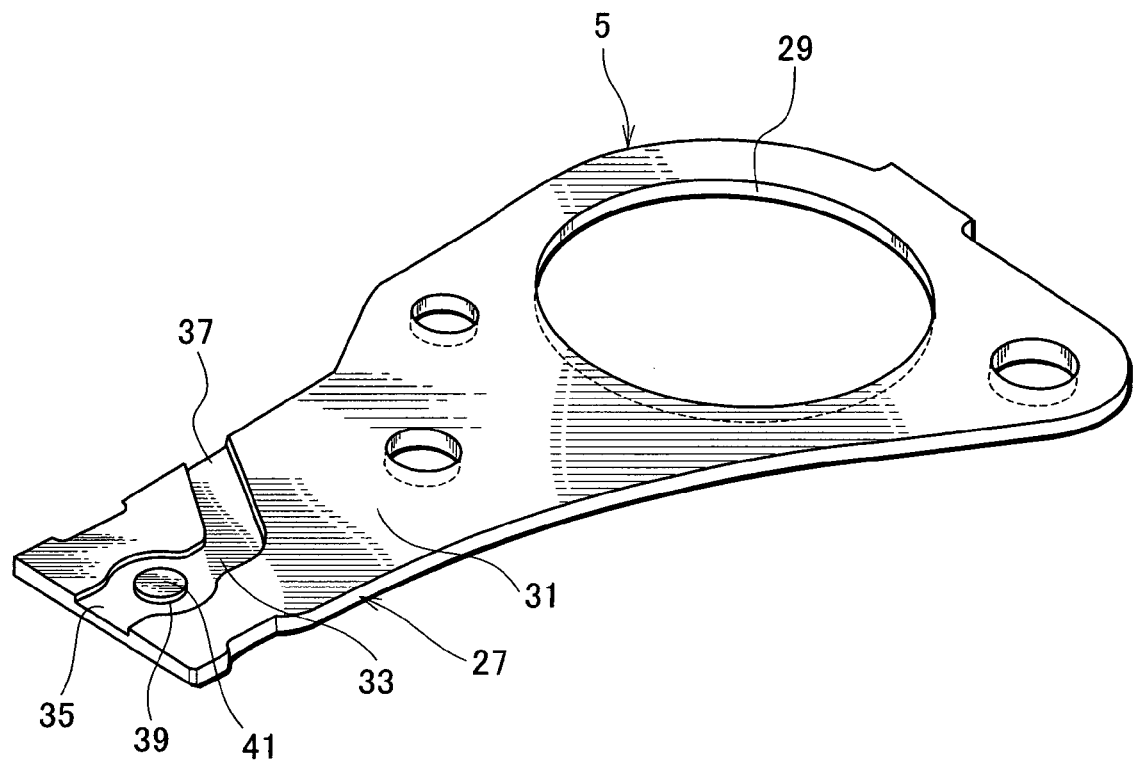
FIG. 4 is a perspective view showing an arm of the head suspension of the first embodiment.
Figure 5:
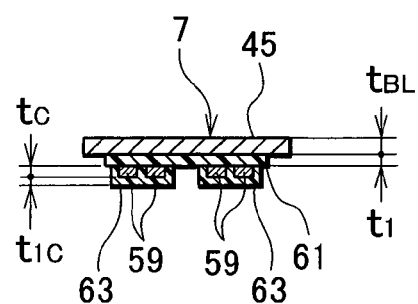
FIG. 5 is a sectional view showing a flexure of the head suspension of the first embodiment.

A head suspension according to the first embodiment of the present invention will be explained with reference to FIGS. 1 to 5 in which FIG. 1 is a perspective view showing the head suspension with wiring patterns seen through a load beam, FIG. 2 is a simple perspective view showing the head suspension, FIG. 3 is a side view showing the head suspension, FIG. 4 is a perspective view showing an arm of the head suspension, and FIG. 5 is a sectional view showing a flexure of the head suspension.

In FIGS. 1 to 3, the head suspension 1 includes the load beam (LB) 3, arm 5, and flexure 7. The head suspension 1 is used for, for example, a 0.85-inch or 1-inch hard disk drive.

The load beam 3 is made of, for example, nonmagnetic SUS304 (Japanese Industrial Standard) stainless steel and has a thickness (tL) of about 30 μm. The load beam 3 applies load (gram load) to a head 9 that writes and reads data to and from a disk. In this specification, the "disk" is a storage medium which is arranged in a hard disk drive and to and from which data is written and read through the head suspension. The load beam 3 includes a rigid part (stiff part) 11 and a resilient part (hinge) 13.

The rigid part 11 extended from a front end to a base end thereof is generally narrow. The front end of the rigid part 11 has a load/unload tab 15. In the vicinity of the front end, the rigid part 11 has a dimple 17 having a height (hDH) of about 50 μm. Each side edge in an across-the-width direction of the rigid part 11 has a reinforcing rail 19 that is formed by box-bending the side edge in a thickness direction of the rigid part 11. Each rail 19 is oriented toward the disk. The height (hR) of the rail 19 from an opposite-to-disk surface 21 of the rigid part 11 is about 200 μm. The opposite-to-disk surface 21 is a surface of the rigid part 11 that is oriented opposite to the disk. In other words, the opposite-to-disk surface 21 is opposite to a disk-side surface 69 of rigid part 11 facing to the disk.

The resilient part 13 is integral with the rigid part 11. The resilient part 13 includes two branches 23 and 25 that extend from both sides of a base end of the rigid part 11 in the across-the-width direction. The thickness (ts) of the resilient part 13 is the same as that of the rigid part 11, i.e., about 30 μm.

The branches 23 and 25 have side edges 24 and 26, respectively. The side edges 24 and 26 are cut along them when a sheet material is cut into a plurality of load beams 3. With this configuration, the rails 19 are extendable to just before the resilient part 13, thereby producing no blanks between the rails 19 and the resilient part 13. This improves the first bending mode frequency (B1 frequency) and shock property of the load beam 3.

In FIGS. 1 to 4, the arm 5 includes an integral base plate 27 serving as a base. Namely, the base plate 27 is a component of the arm 5 side. The base plate 27 may be independent of the arm 5 and may be attached to the arm 5 by, for example, swaging. If the base plate 27 is independent of the arm 5, the base plate 27 may be integral with the load beam 3. The arm 5 has a thickness (tA) of about 200 μm. The arm 5 has a hole 29 to be fitted to a carriage of a hard disk drive so that the arm 5 is turned around a spindle.

In FIG. 4, an opposite-to-disk surface 31 of the base plate 27 has a groove 33 to receive wiring patterns 47 (to be explained later). The opposite-to-disk surface 31 is a surface of the base plate 27 that faces opposite to the disk. In other words, the opposite-to-disk surface 31 is opposite to a disk-side surface 77 of the arm 5 facing to the disk. The groove 33 is formed by pressing, machining, etching, or the like and has a depth (hD) of about 30 μm. The groove 33 is extended between a longitudinal edge and a side edge of the base plate 27 in a direction along the opposite-to-disk surface 31 and has ends 35 and 37 that are respectively open to the longitudinal and side edges. In the vicinity of the end 35, the groove 33 has a flexure fixing projection 39. The projection 39 has a surface 41 that is flush with the opposite-to-disk surface 31.

In FIGS. 1 to 3, the branches 23 and 25 of the resilient part 13 are fixed to the opposite-to-disk surface 31 of the base plate 27 of the arm 5 at weld spots 43. Two weld spots 43 are formed on each of the branches 23 and 25 by, for example, laser welding. Namely, the load beam 3 is supported with the base plate 27 such that the resilient part 13 at the base end of the rigid part 11 is fixed to the base plate 27.

In FIGS. 1 to 3 and 5, the flexure 7 extends along the load beam 3 to the arm 5, includes a base layer 45 and the wiring patterns 47, and supports the head 9. The wiring patterns 47 are connected to the head 9 to write and read data to and from the disk.

The base layer 45 is a conductive thin plate made of, for example, resilient stainless steel (SUS). At the head 9, the base layer 45 has a tongue 49 that supports a slider whose thickness (tSH) is about 230 μm. On the arm 5, the base layer 45 has a fixing circle 53 and a fixing tongue 55. An end of the base layer 45 extends out of the arm 5 and forms a terminal support 57.

Ends of the wiring patterns 47 are electrically connected to write and read terminals arranged on the slider 51 at the head 9. The other ends of the wiring patterns 47 are connected to terminals arranged on the terminal support 57.

In FIGS. 1 and 5, the wiring patterns 47 are made of conductors 59. The conductors 59 are arranged on an insulating layer 61 made of, for example, polyimide resin on the base layer 45. The conductors 59 are covered with an insulating cover 63 made of, for example, polyimide resin.

The base layer 45, insulating layer 61, conductors 59, and insulating cover 63 have thicknesses of tBL=20 μm, tI=10 μm, tc=10 μm, and tIC=5 μm, respectively. The depth (hD) of the groove 33 formed in the base plate 27 is deeper than the total of the thicknesses of the insulating layer 61, conductors 59, and insulating cover 63. The depth (hD) of the groove 33 may be equal to the total of the thicknesses of the insulating layer 61, conductors 59, and insulating cover 63.

In FIGS. 1 to 3, the flexure 7 is arranged so that the wiring patterns 47 are oriented toward the disk. The flexure 7 is fixed to the disk-side surface 69 of the rigid part 11 at a weld spot 71 by, for example, laser welding.

The flexure 7 is arranged on the opposite-to-disk surface 31 of the arm 5, and the circle 53 of the flexure 7 is fixed to the projection 39 at a weld spot 72 by, for example, laser welding. The tongue 55 of the flexure 7 is laser-welded to the opposite-to-disk surface 31 at weld spots 73 that are on each side of the end 37 of the groove 33.

According to the first embodiment, the wiring patterns 47 are received in the groove 33 and are arranged between the base layer 45 of the flexure 7 and the base plate 27 of the arm 5.

In FIG. 3, the disk-side surface 77 of the arm 5 is within the total thickness of the rigid part 11 and head 9.

According to the first embodiment, a distance (HA) between the opposite-to-disk surface 31 of the arm 5 and a disk-side surface 75 of the slider 51 is 310 μm. The disk-side surface 75 is a surface of the slider 51 that faces the disk.

A distance between the opposite-to-disk surface 21 of the rigid part 11 and the disk-side surface 75 of the slider 51 is equal to the total of the thickness tSH=230 μm of the slider 49, the thickness tBL=20 μm of the base layer 45 of the flexure 7, the height hDH=50 μm of the dimple 17, and the thickness tL=30 μm of the load beam 3, i.e., Hs=330 μm in total.

According to the first embodiment, the distance HA=310 μm on the arm 5 side is smaller than the total distance Hs=330 μm of the rigid part 11 and head 9 side on the load beam 3. It is possible to set as HA=Hs, or HA>Hs.

In this way, the head suspension 1 according to the first embodiment has the resilient part 13 and flexure 7 that are fixed to the opposite-to-disk surface 31 of the arm 5. With this configuration, the first embodiment can reduce a step between the arm 5 and the load beam 3 while keeping the flexure 7 on the arm 5 side away from a disk. As a result, the wiring patterns 47 of the flexure 7 are not damaged during postprocesses.

The rigid part 11 has the reinforcing rails 19 formed by box-bending the side edges of the rigid part 11 in a direction toward the disk. The rails 19 can improve the shock property of the head suspension 1 and secure the rigidity of the load beam 3. The height (hR=200 μm) of the rails 19 is lower than the total height (Hs=330 μm) of the rigid part 11 and head 9, and therefore, the rails 19 constitute no obstacles when applied for a thin hard disk drive.

The flexure 7 includes the base layer 45 and wiring patterns 47. The wiring patterns 47 are formed on the base layer 45 and are arranged between the base layer 45 and the arm 5. While minimizing a step between the arm 5 and the load beam 3, the resilient part 13 and flexure 7 can easily be attached to the arm 5. The flexure 7 on the arm 5 side is apart from the disk so that the wiring patterns 47 are not damaged during postprocesses.

The arm 5 has the groove 33 to receive the wiring patterns 47 of the flexure 7, so that the flexure 7 on the arm 5 is separated away from the disk. This configuration prevents the wiring patterns 47 from being damaged in postprocesses. In addition, the configuration suppresses a protrusion of the flexure 7 from the opposite-to-disk surface 31 of the arm 5, thereby contributing to thinning a hard disk drive.

The resilient part 13 is integral with the rigid part 11, to minimize a step between the arm 5 and the load beam 3 and easily fix the resilient part 13 to the opposite-to-disk surface 31 of the arm 5. In addition, this configuration reduces the number of parts, simplifies the structure of the head suspension 1, and lessens the managing and assembling labor of parts.

Figure 6:
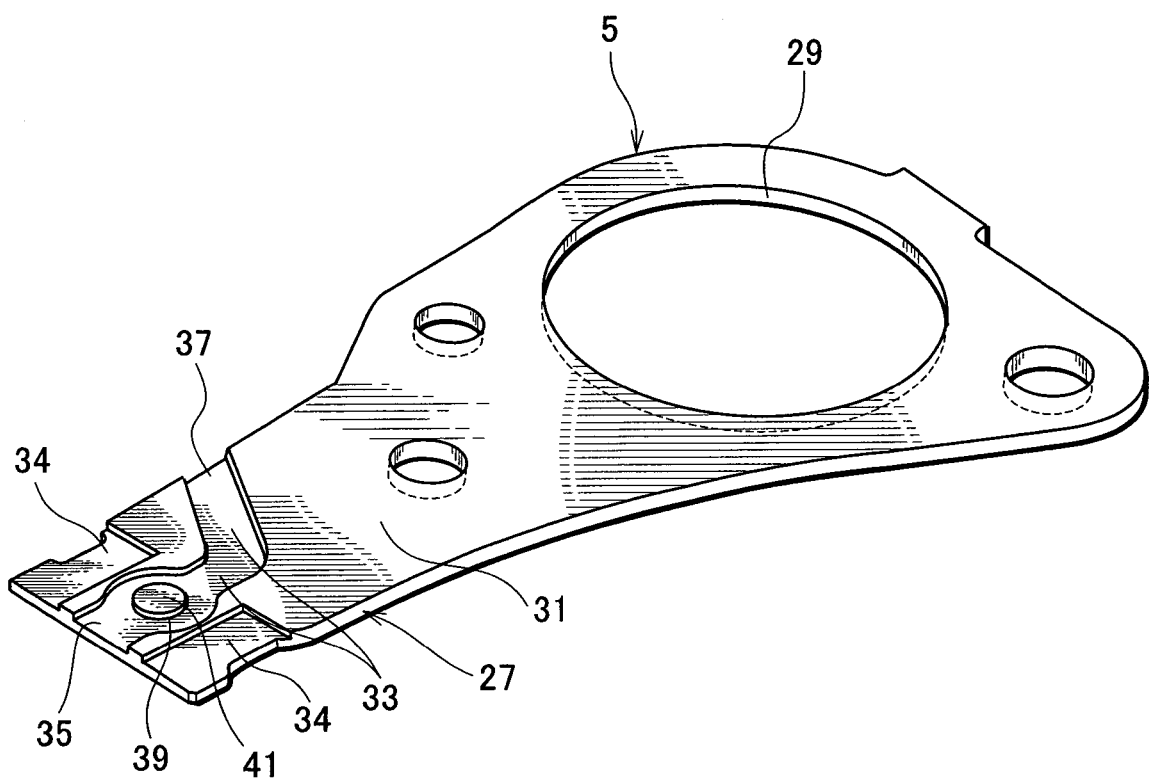
FIG. 6 is a perspective view showing an arm according to a modification of the first embodiment.

FIG. 6 is a perspective view showing an arm according to a modification of the first embodiment of the present invention. The arm 5 has a groove 33 for receiving the wiring patterns 47 of the flexure 7 and grooves 34 for receiving the branches 23 and 25 of the resilient part 13. Like the groove 33, the grooves 34 are formed by pressing, machining, etching, or the like. The depth of the grooves 34 is equal to or greater than the thickness of the branches 23 and 25.

The grooves 33 and 34 are made simultaneously, and therefore, labor for forming them is substantially the same as that for forming the groove 33 alone.

The branches 23 and 25 of the resilient part 13 are arranged in the grooves 34 and are fixed thereto. This prevents the resilient part 13 from protruding out of an opposite-to-disk surface 31 of the arm 5, thereby contributing to thinning a hard disk drive.

Second Embodiment

Figure 7:
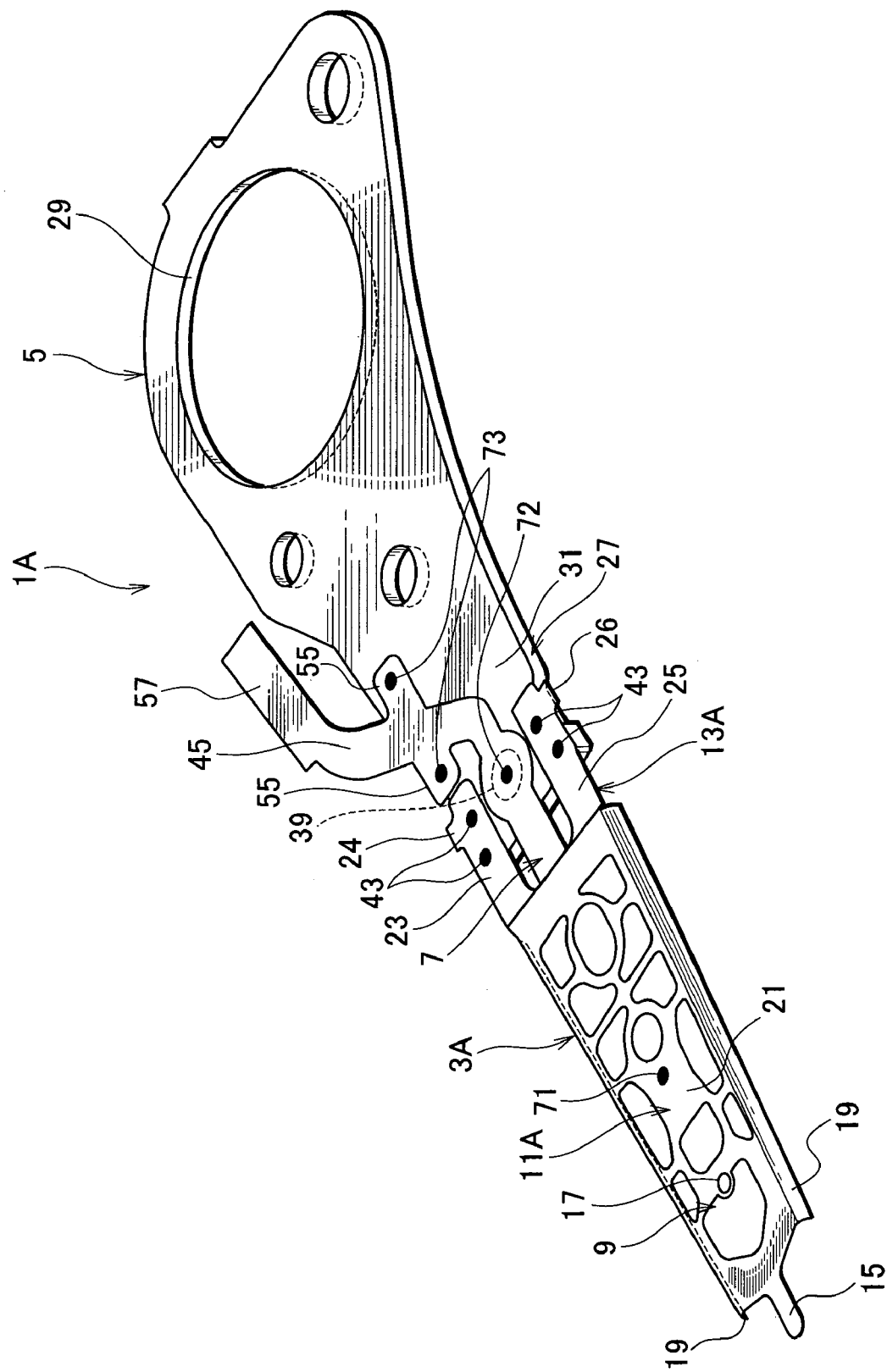
FIG. 7 is a simple perspective view showing a head suspension according to a second embodiment of the present invention.

A head suspension according to the second embodiment of the present invention will be explained with reference to FIGS. 7 and 8 in which FIG. 7 is a simple perspective view showing the head suspension and FIG. 8 is a partly sectioned side view showing part of the head suspension. The structure of the second embodiment is basically the same as that of the first embodiment, and therefore, the same or corresponding parts are represented with the same reference numerals or the same reference numerals plus "A."

In FIGS. 7 and 8, the head suspension 1A according to the second embodiment includes a resilient part 13A whose thickness t1 is greater than a thickness t2 of a rigid part 11A. This configuration is effective to thin a load beam 3A and improve the resiliency of the resilient part 13A. According to the second embodiment, the thicknesses are t1=25 μm and t2=20 μm.

The thicknesses t1 and t2 may be optionally set based on a hard disk drive in which the head suspension 1A is installed, provided that the thickness t1 of the resilient part 13A is greater than the thickness t2 of the rigid part 11A to thin the load beam 3 and improve the resiliency of the resilient part 13A.

FIG. 9 is a list showing a relationship among the beam (rigid part) thickness, hinge (resilient part) thickness, and shock property of a head suspension. FIG. 10 is a graph based on the list of FIG. 9. The shock property of a load beam is expressed with the magnitude of a shock at which a slider of the load beam is lifted from the surface of a disk. The phenomenon that a slider of a load beam lifts off from the surface of a disk in response to the application of a shock is referred to as "G-lift-off." The "G-lift-off" is also indicative of the magnitude of the shock that causes a lift-off of the slider.

In FIGS. 9 and 10, the thickness t1 of the resilient part 13A is fixed at 25 μm, and the thickness t2 of the rigid part 11A is changed as 35, 30, 25, and 20 μm. In response to these reductions in the thickness, the head suspension 1 increases its G-lift-off as 357.2 G/gf, 386.0 G/gf, 419.1 G/gf, and 462.3 G/gf.

When the thickness t2 of the rigid part 11A is 20 μm that is smaller than the thickness t1 of the resilient part 13A of 25 μm, the head suspension 1 greatly improves its G-lift-off as shown in grayed cells in the table of FIG. 9.

Figure 11:
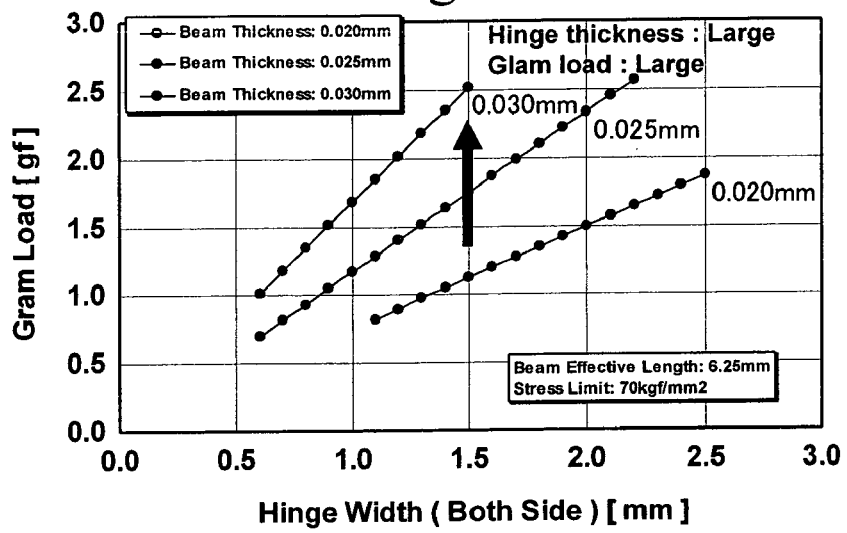
FIG. 11 is a graph showing a relationship between the width of a resilient part and a gram load measured on load beams having different thicknesses.
Figure 12:
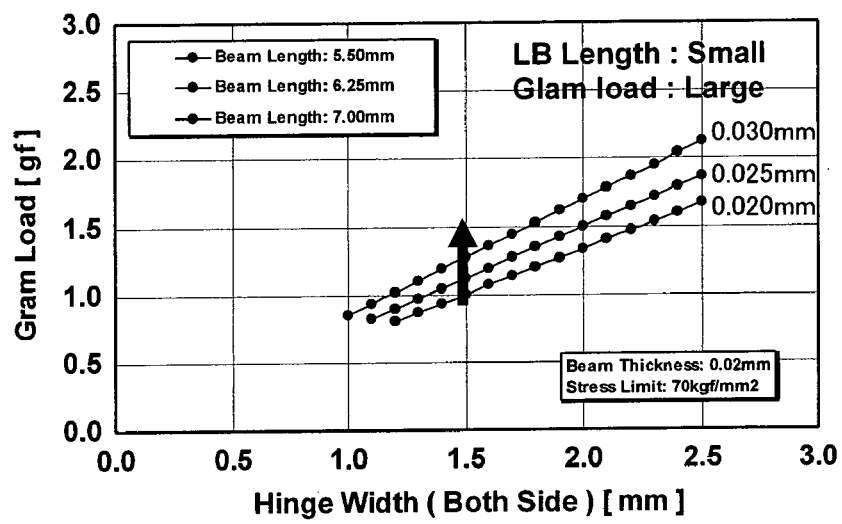
FIG. 12 is a graph showing a relationship between the width of a resilient part and a gram load measured on load beams having different lengths.
Figure 13:
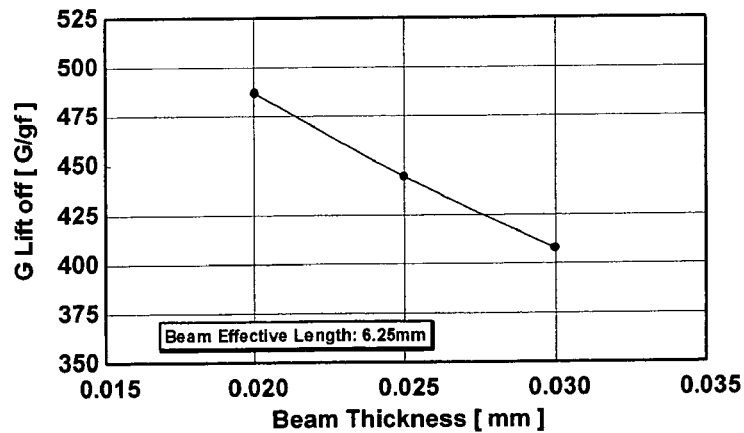
FIG. 13 is a graph showing a relationship between the thickness of a load beam and a lift-off level (G-lift-off)

FIGS. 11 to 13 are graphs showing test results that verify that thinning a rigid part thinner than a resilient part improves the shock property of a head suspension.

FIG. 11 shows a relationship between the width of a resilient part and a gram load measured on load beams having different thicknesses. An abscissa indicates the width of a resilient part (hinge), and an ordinate indicates gram load. The load beams shown in FIG. 11 each include a rigid part and a resilient part that are integral with each other. The load beams have thicknesses of 20 μm, 25 μm, and 30 μm, respectively, a length (IL) of 6.25 mm, and a stress limit of 70 kgf/cm² because each is made of SUS304.

If a width allowed for a resilient part (hinge) is 2.0 mm, the resilient part may be drilled to have a hole to realize an effective width of, for example, 1.2 mm. If a resilient part has an effective width of 1.5 mm and a thickness of 20 μm which is equal to the thickness of a load beam, a limit gram load applied by the resilient part is 1.5 gf as shown in FIG. 11. A resilient part having an increased thickness of 30 μm and an effective width of 1.2 mm can achieve a gram load of 2.0 gf.

FIG. 12 is a graph showing a relationship between the width of a resilient part and a gram load measured on load beams having different lengths. An abscissa indicates the width of a resilient part (hinge), and an ordinate indicates gram load. The load beams shown in FIG. 12 have lengths of 5.50 mm, 6.25 mm, and 7.00 mm, respectively, a thickness (t) of 20 μm, and a stress limit of 70 kgf/cm² because each is made of SUS304.

As is apparent in FIG. 12, changes in the length of a load beam only slightly influence the gram load of the load beam.

It is understood from FIGS. 11 and 12 that the thickness, not length, of a load beam greatly influences a gram load applied by the load beam. Namely, a narrow load beam for a miniaturized hard disk drive must have a thick resilient part.

FIG. 13 is a graph showing a relationship between the thickness of a load beam and a lift-off level (G-lift-off). An abscissa indicates the thickness of a load beam and an ordinate indicates G-lift-off.

It is clear in FIG. 13 that the thicker the load beam, the poorer the G-lift-off or shock property of the load beam.

From FIGS. 11 to 13, it is apparent that the resilient part must be thick and the rigid part must be thin to secure a high G-lift-off level and a high gram load.

For this, the second embodiment makes the thickness t1 of the resilient part 13A thicker than the thickness t2 of the rigid part 11A, to thereby thin the load beam 3A and increase the resilience of the resilient part 13A. As a result, the head suspension 1A of the second embodiment can secure a high G-lift-off level and a high gram load.

The second embodiment provides effects similar to those of the first embodiment.

In addition, the second embodiment improves the shock property of the head suspension 1A.

Third Embodiment

Figure 14:
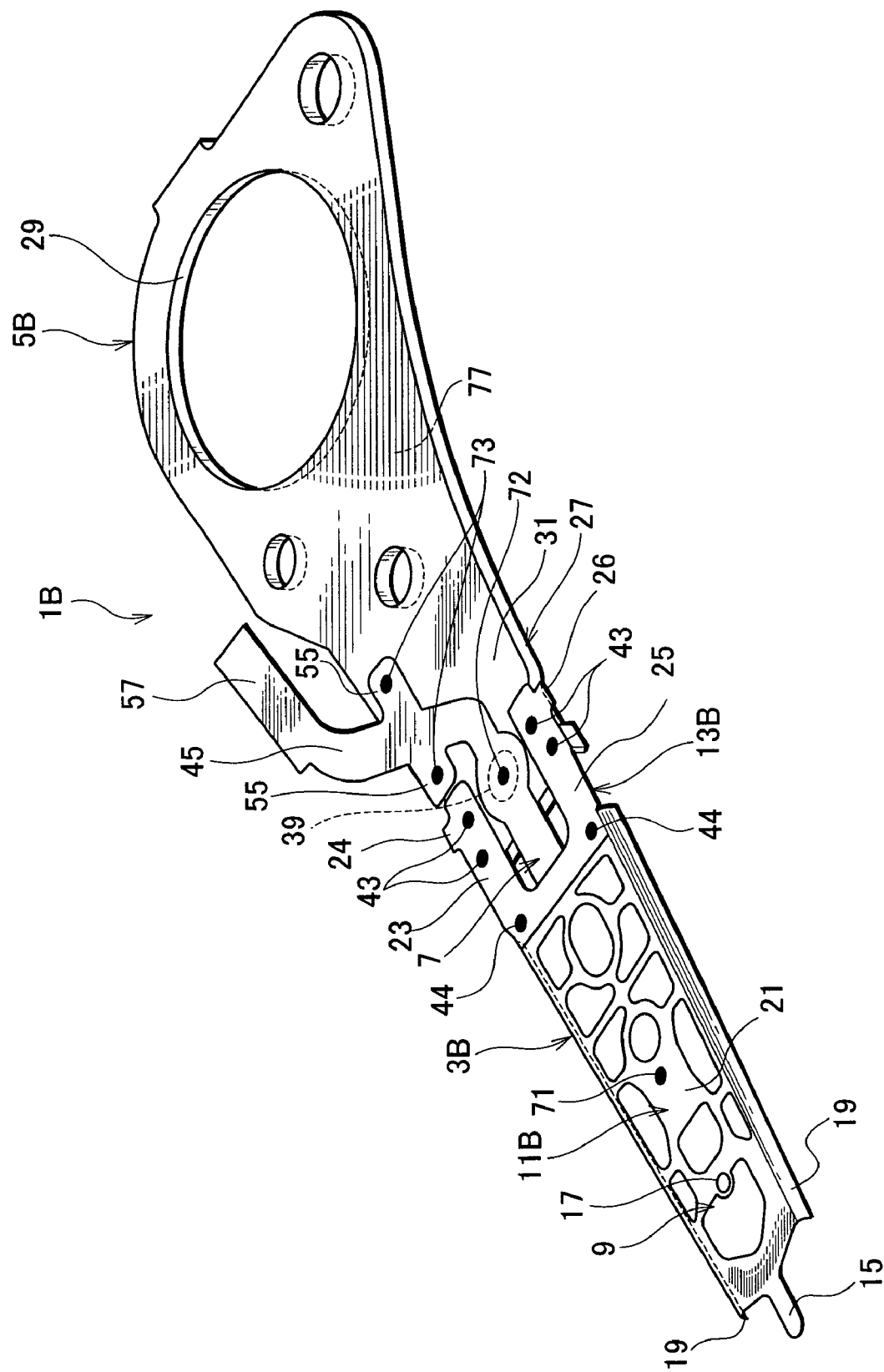
FIG. 14 is a simple perspective view showing a head suspension according to a third embodiment of the present invention.

FIG. 14 is a simple perspective view showing a head suspension according to the third embodiment of the present invention. The third embodiment substantially has the same structure as the first embodiment, and therefore, the same or corresponding parts are represented with the same reference numerals or the same reference numerals plus "B."

In FIG. 14, the head suspension 1B of the third embodiment includes a resilient part 13B that is independent of a load beam 3B and an arm 5. The resilient part 13B is fixed to the arm 5 at weld spots 43 and to the load beam 3B at weld spots 44.

The third embodiment provides effects similar to those of the first embodiment.

Fourth Embodiment

Figure 15:
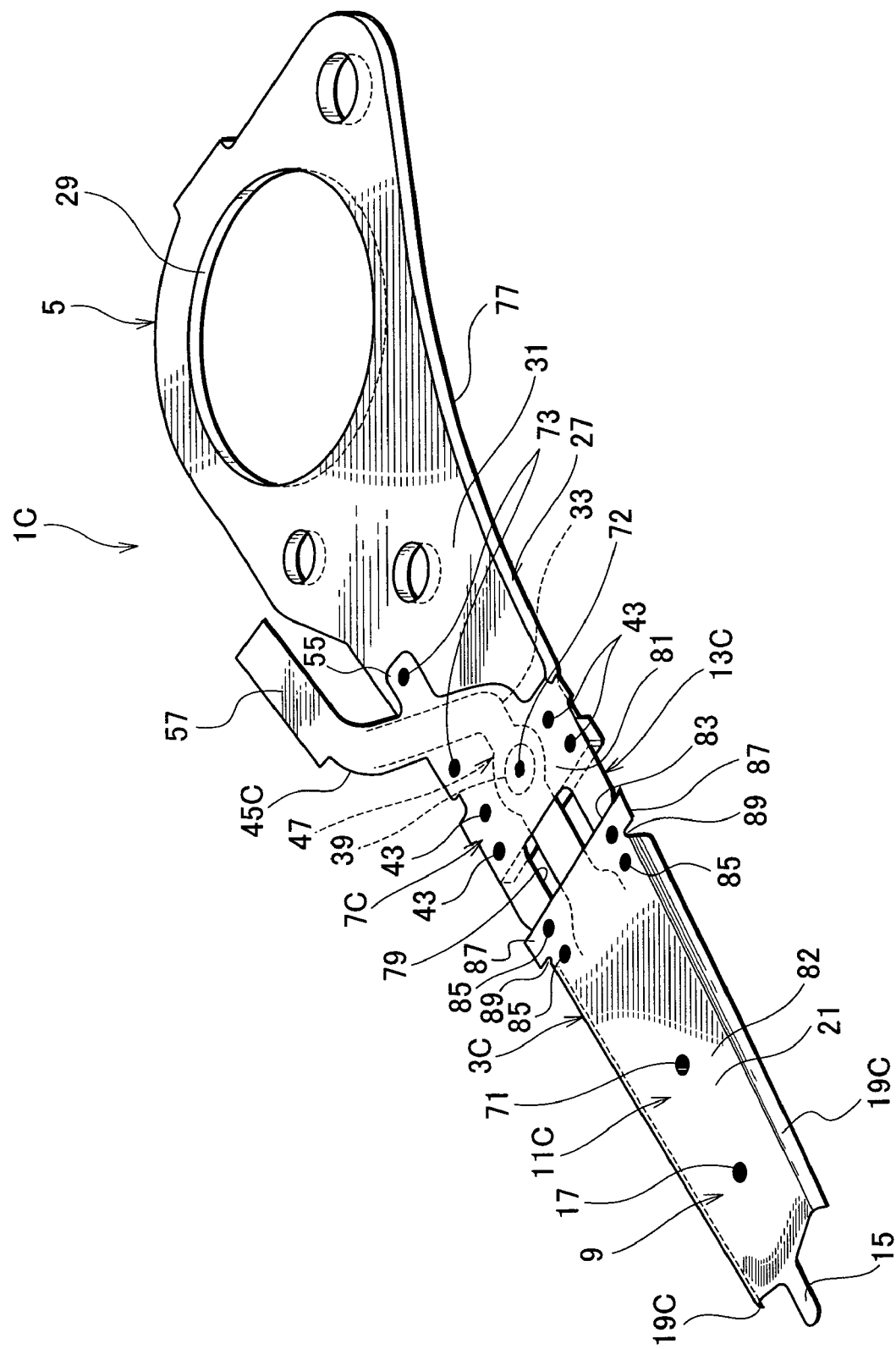
FIG. 15 is a simple perspective view showing a head suspension according to a fourth embodiment of the present invention.

FIG. 15 is a simple perspective view showing a head suspension according to the fourth embodiment of the present invention. The fourth embodiment substantially has the same structure as the first embodiment, and therefore, the same or corresponding parts are represented with the same reference numerals or the same reference numerals plus "C."

In FIG. 15, the head suspension 1C of the fourth embodiment includes a base plate 27 serving as a part of an arm 5. Namely, the base plate 27 is a component of the arm 5 side. The base plate 27 has an opposite-to-disk surface 31 to which a flexure 7C is fixed.

The flexure 7C includes a base layer 45C and wiring patterns 47 arranged on the base layer 45C. The base layer 45C of the flexure 7C has a resilient part 13C integrally. The resilient part 13C is formed from each side of the base layer 45C defined by an opening 79.

The base layer 45C includes a fix part 81 and a tongue 55 and is fixed to the opposite-to-disk surface 31 of the base plate 27 at weld spots 43, 72, and 73. Between the base layer 45C of the flexure 7C and the base plate 27, the wiring patterns 47 are arranged. Like the base plate 27 of FIG. 4, the base plate 27 of FIG. 15 has a groove 33 in the opposite-to-disk surface 31, to correspond to and receive the wiring patterns 47.

A rigid part 11C has a body 82. A base end of the body 82 is a joint part 83. The resilient part 13C of the flexure 7C is extended over the joint part 83 to the body 82 and fixed to the joint part 83 and the body 82. Namely, the flexure 7C is fixed to the rigid part 11C at two weld spots 85 on each side at the resilient part 13C. This is a 2-point laser weld technique.

Each side edge 87 of the joint part 83 of the rigid part 11C is cut along the same when a plurality of rigid parts 11C are formed from a plate material. Due to this, a rail 19C formed along each side edge of the rigid part 11C cannot be extended along the side edge 87, thereby forming a blank 89 between the rail 19C and the joint part 83. If the flexure 7C is fixed to the joint part 83 of the rigid part 11C at a single weld spot (1-point laser weld technique) on each side, the presence of the blank 89 will decrease the B1 frequency (first bending mode frequency) of the load beam 1C.

To avoid this, the fourth embodiment welds the flexure 7C to the joint part 83 and the body 82 of the rigid part 11C at two weld spots 85 on each side, to reinforce each blank 89 between the rail 19C and the joint part 83 without increasing the number of parts.

Figures 16, 17:
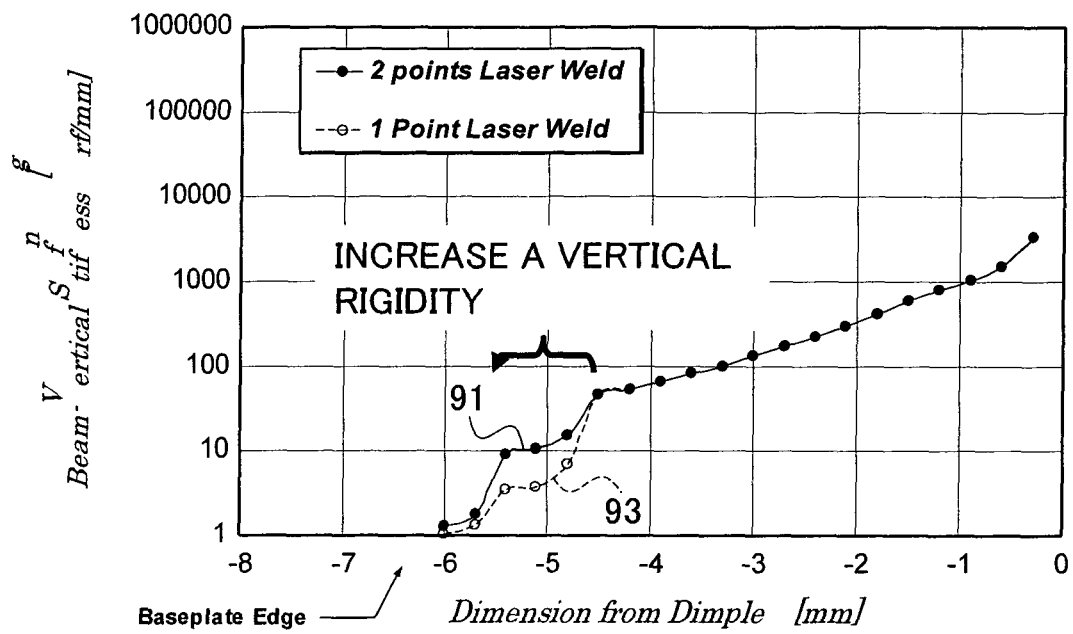
FIG. 16 is a graph showing a distribution of vertical rigidity (stiffness) of a load beam of the fourth embodiment and that of a related art.
FIG. 17 is a list showing the first bending mode frequencies (B1 frequencies) and static shock properties of load beams having four different thicknesses ranging from 20 μm to 35 μm.

FIG. 16 is a graph showing a distribution of vertical rigidity (stiffness) of the load beam 1C of the fourth embodiment and that of a related art. An abscissa indicates a distance from a dimple 17 and an ordinate indicates rigidity (stiffness). The distance from the dimple 17 is zero at the dimple 17, is −6 at an end of the arm 5, and is approximately −5 at the blanks 89.

In FIG. 16, a 2-point-laser-weld curve 91 represents the fourth embodiment and a 1-point-laser-weld curve 93 represents a related art employing the 1-point laser weld technique.

As is apparent in FIG. 16, the fourth embodiment that reinforces the blanks 89 can secure a proper vertical rigidity despite the presence of the blanks 89.

FIG. 17 is a list showing the first bending mode frequencies (B1 frequencies) and static shock properties (G-lift-off) of load beams having four different thicknesses ranging from 20 μm to 35 μm. The thickness of a resilient part (13C) is fixed at t=25 μm.

In the columns of B1 frequencies, i.e., first bending frequencies, values in a left column are of the related art employing the 1-point laser weld technique and values in a right column are of the fourth embodiment employing the 2-point laser weld technique. Similarly, in the columns of G-lift-off, values in a left column are of the related art and values in a right column are of the fourth embodiment. Values in the column of ABl represent differences between the B1 frequencies of the related art and those of the fourth embodiment.

Figure 18:
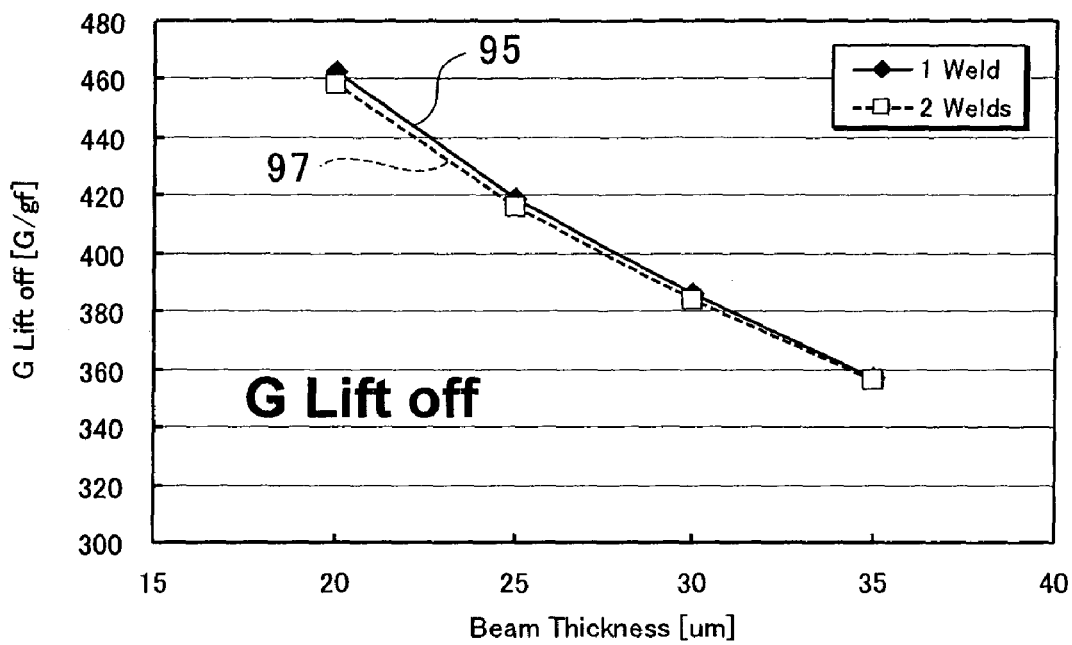
FIG. 18 is a graph showing shock properties of the load beams of FIG. 17.
Figure 19:
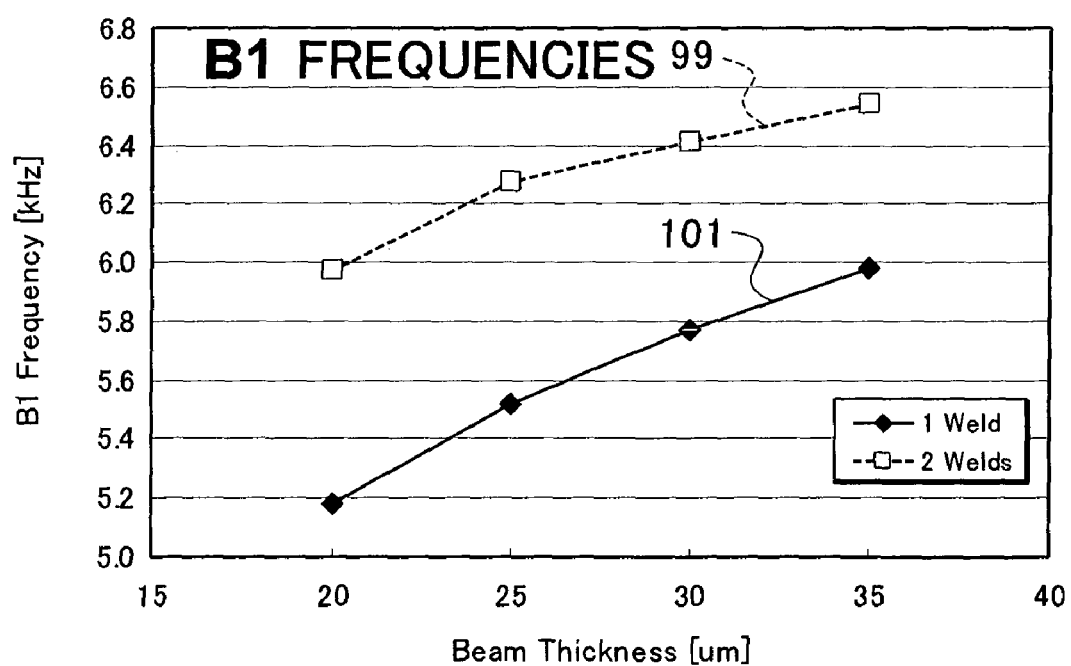
FIG. 19 is a graph showing B1 frequencies of the load beams of FIG. 17.

FIGS. 18 and 19 are graphs plotted from the values shown in FIG. 17. The graph of FIG. 18 shows the static shock properties of the load beams. An abscissa indicates the thickness of a load beam and an ordinate indicates the G-lift-off of the load beam. The graph of FIG. 19 shows the B1 frequencies of the load beams. An abscissa indicates the thickness of a load beam and an ordinate indicates the B1 frequency of the load beam.

In FIG. 18, a curve 95 represents the load beams according to the related art employing the 1-point laser weld technique and a curve 97 represents the load beams according to the fourth embodiment employing the 2-point laser weld technique. It is understood from FIG. 18 that the related art and fourth embodiment increase the G-lift-off as the thickness of the load beam becomes thinner. The head suspensions of the fourth embodiment show no deterioration in the shock properties thereof.

In FIG. 19, a curve 99 represents the load beams according to the fourth embodiment and a curve 101 represents the load beams according to the related art employing the 1-point laser weld technique. For each load beam thickness, the fourth embodiment demonstrates a higher B1 frequency than the related art.

As is apparent in FIGS. 18 and 19, the fourth embodiment employing the 2-point laser weld technique can increase the B1 frequency higher than the related art employing the 1-point laser weld technique, without deteriorating the static shock property. For a given B1 frequency, the fourth embodiment can increase G-lift-off by 100 G/gf higher than the related art.

An analysis of characteristics or properties that are required for a load beam to follow the motion of an arm will be explained.

Figure 20A:
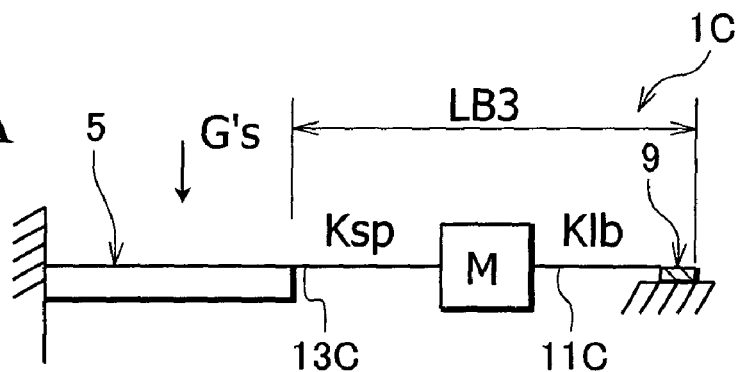
FIG. 20A is an analytic model showing a head suspension.
Figure 20B:
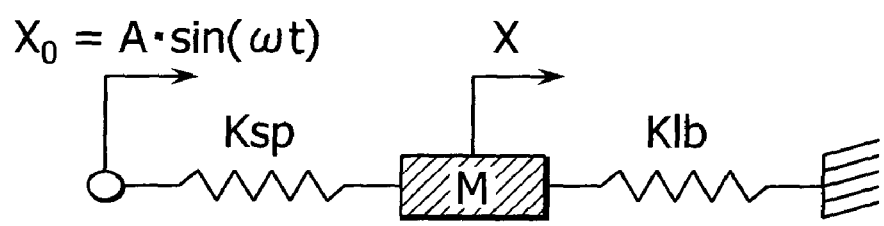
FIG. 20B is a vibration model based on the model of FIG. 20A.

FIG. 20A is an analytic model showing a head suspension and FIG. 20B is a vibration model based on the model of FIG. 20A. In FIGS. 20A and 20B, M is a mass assumed to be concentrated on the gravity center of a load beam 3C, Ksp is a spring constant of the load beam 3C from the gravity center to a resilient part 13C, Klb is a spring constant due to the rigidity of a rigid part 11C from the gravity center to a dimple, G's is a shock input, X0 is an arm action, and X is a displacement of the load beam 3C at the gravity center.

The displacement X is expressed as follows:

$$X = A/\{(Klb/Ksp) - (\omega/\omega 0)^2 + \omega 0^2\} \quad (1)$$

$$\omega 0^2 = Ksp/M$$

Figure 21:
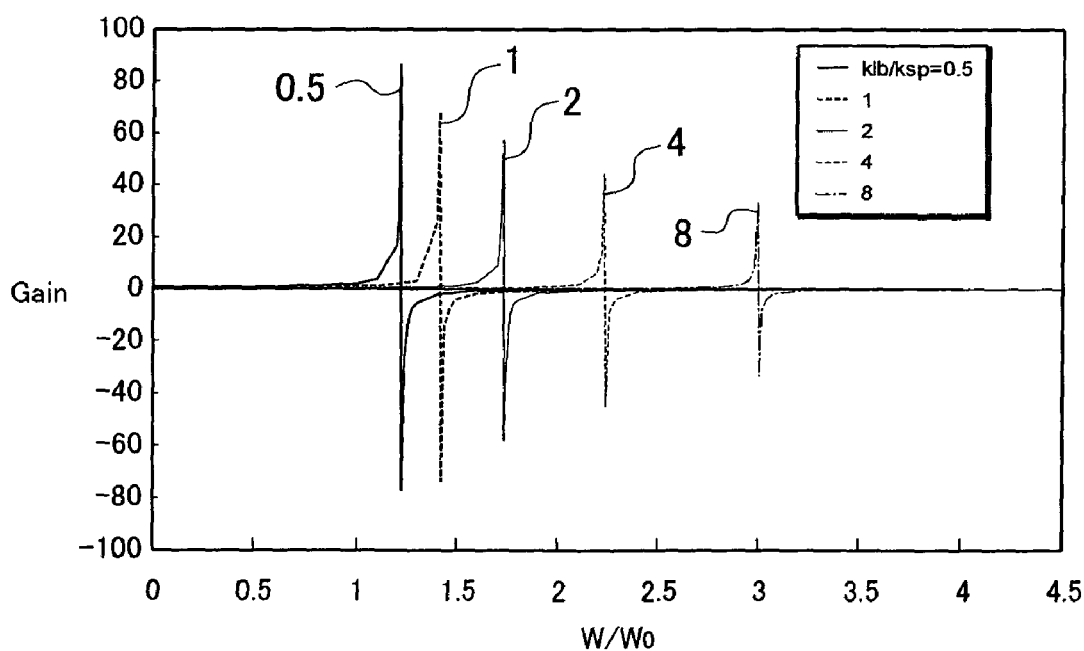
FIG. 21 is a graph showing a relationship between an increase in "Klb/Ksp" and a gain based on the models of FIGS. 20A and 20B.

Reducing the displacement X results in suppressing a lift of a slider from a disk. For this, the expression (1) indicates that (Klb/Ksp) and $\omega 0^2$ must be increased. FIG. 21 is a graph showing a relationship between an increase in (Klb/Ksp) and a gain. When (Klb/Ksp) is increased as 0.5, 1, 2, 4, and 8 as shown in FIG. 21, the frequency increases and the gain decreases.

To increase (Klb/Ksp), Klb must be increased because Ksp is restricted by the resilient part 13C. Namely, the vertical stiffness (rigidity) of the load beam must be improved. To increase $\omega 0^2$, M must be reduced.

In consequence, to reduce the displacement X, the vertical stiffness of the load beam must be improved and the mass M must be reduced.

Figures 22, 23:
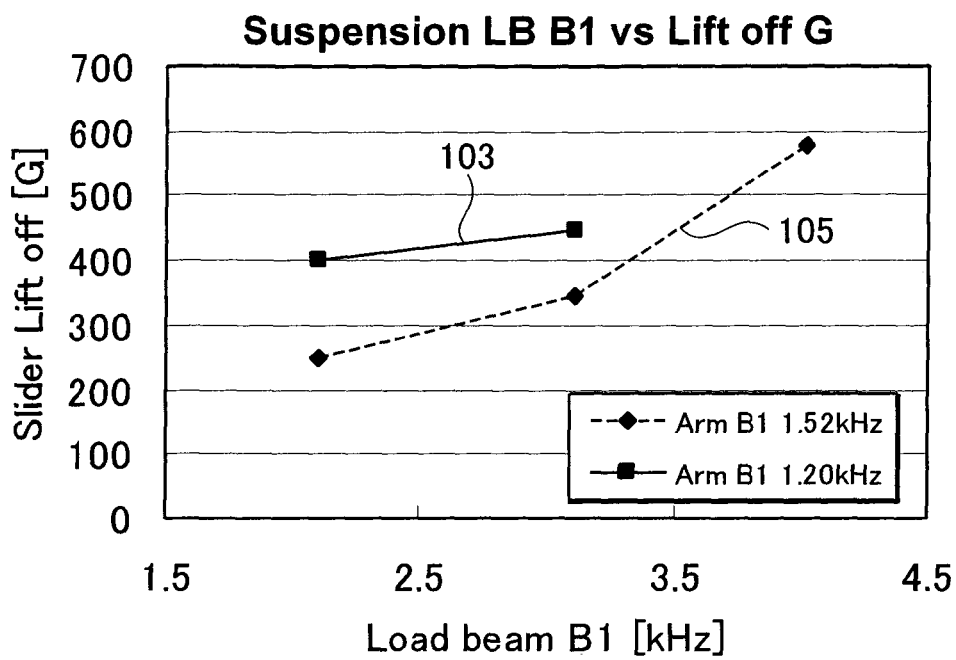
FIG. 22 is a graph showing a relationship among the B1 frequency of an arm, the B1 frequency of a load beam, and the lift-off acceleration of a slider.
FIG. 23 is a list showing a relationship among the lift-off of a slider, the magnitude of a shock applied, and the B1 frequency of a load beam that supports the slider.

FIG. 22 is a graph showing a relationship among the B1 frequency of an arm, the B1 frequency of a load beam, and the lift-off of a slider. An abscissa represents the B1 frequency of a load beam and an ordinate represents the acceleration of a shock at which a slider of the load beam lifts. A curve 103 is for an arm having a B1 frequency of 1.20 kHz and a curve 105 is for an arm having a B1 frequency of 1.52 kHz.

As is apparent in FIG. 22, a load beam having a low B1 frequency is unable to follow the arm having the high B1 frequency, demonstrates an inferior shock property, and causes the slider thereof to lift at a low acceleration. A load beam having a B1 frequency of 4 kHz can sufficiently follow the arm having the high B1 frequency of 1.52 kHz, demonstrates a superior shock property, and realizes a high acceleration level at which the slider thereof lifts.

Data shown in FIG. 22 relates to assemblies each consisting of only a carriage arm and a head suspension. In practice, the behavior of a head suspension base, the operation mode of a disk, and other conditions are involved to complicate situations around the head suspension. FIG. 23 shows data sampled from head suspensions in more practical situations.

FIG. 23 is a list showing a relationship among the lift-off of a slider, the magnitude of a shock applied, and the B1 frequency of a head suspension that supports the slider. The data shown in FIG. 23 relates to a 2.5-inch hard disk drive. When the B1 frequency of a load beam is increased from 3.11 kHz to 4.02 kHz as shown in FIG. 23, the level of a shock of 0.4 msec duration at which the slider of the load beam lifts increases from 296 G to 325 G. In this way, increasing the B1 frequency of a load beam is effective to suppress a lift-off of the slider of the load beam.

Figure 24:
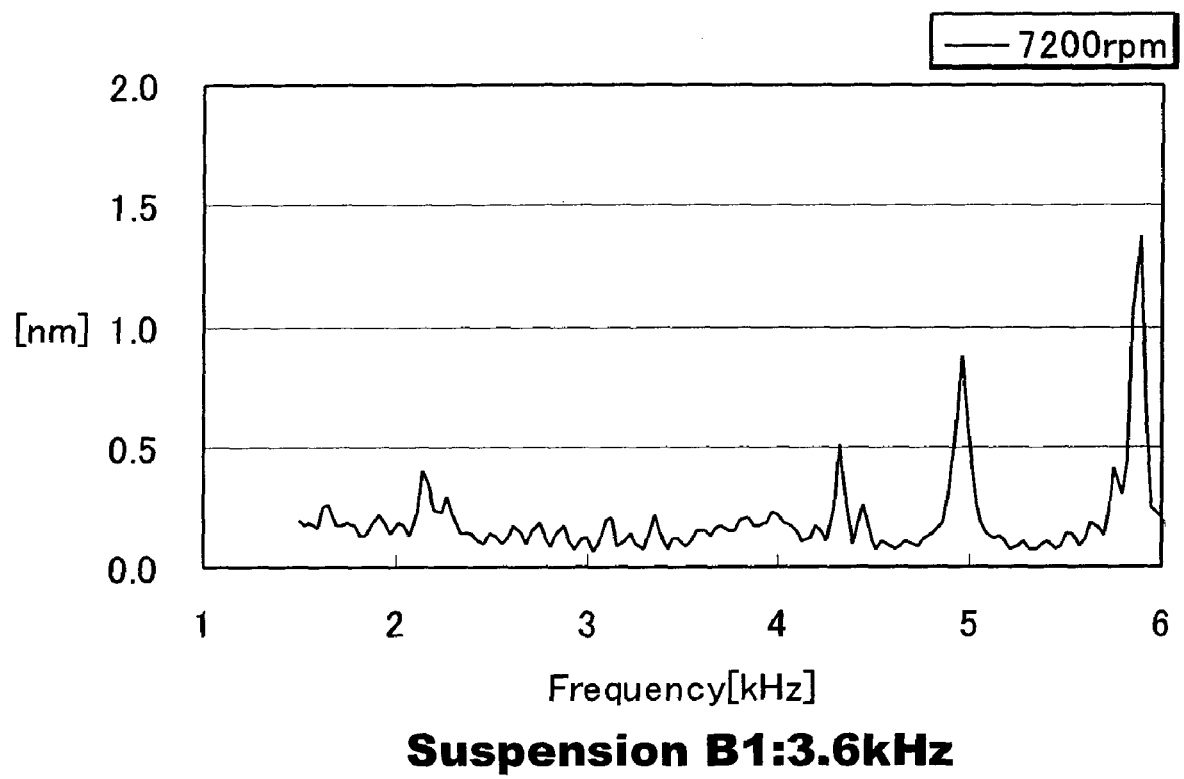
FIG. 24 is a graph showing the off-track property of a head suspension, including an arm, which has a total B1 frequency of 3.6 kHz.

FIG. 24 is a graph showing the off-track property of a head suspension, including an arm, which has a total B1 frequency of 3.6 kHz. An abscissa represents frequencies and an ordinate represents off-track amount. The data shown in FIG. 24 relates to a 2.5-inch hard disk rotating at 7200 rpm.

Figure 25:
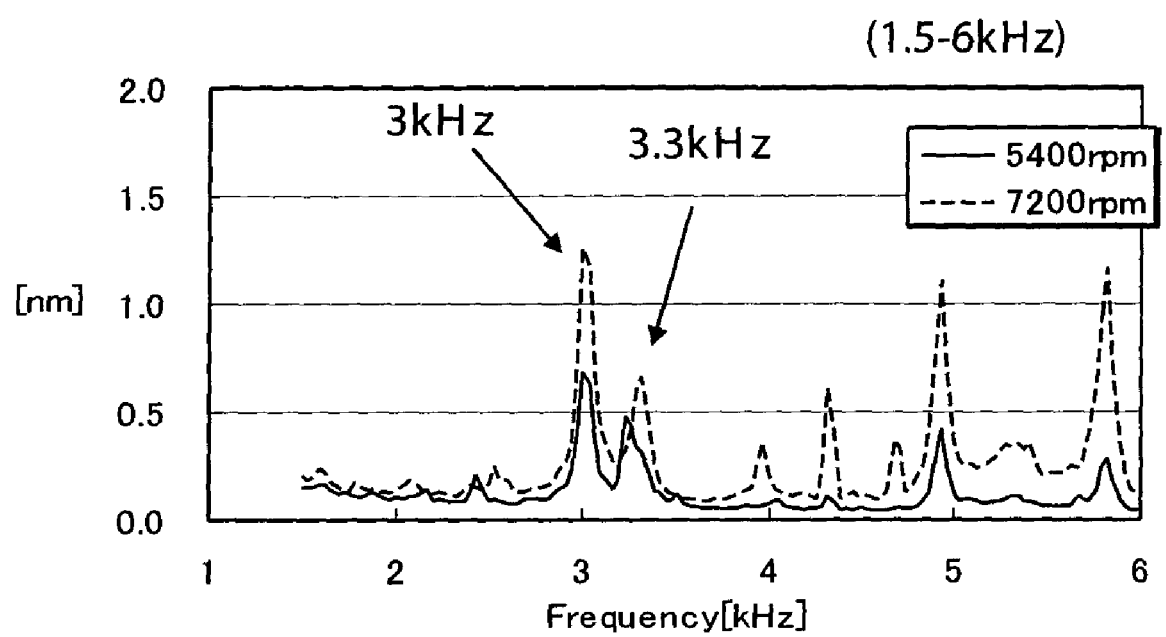
FIG. 25 is a graph showing the off-track property of a head suspension having a total B1 frequency of 3.1 kHz according to a related art.
Figure 26:
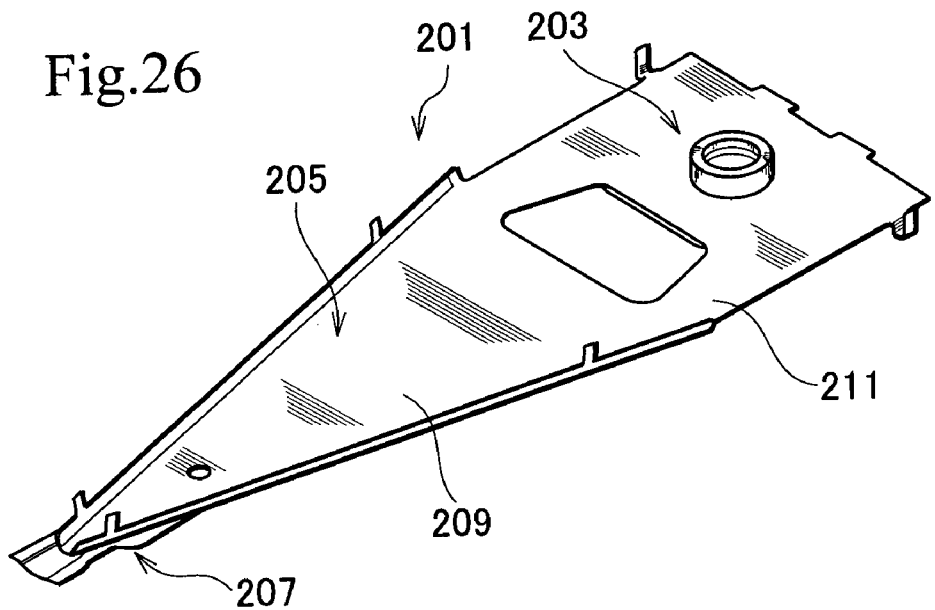
FIG. 26 is a perspective view showing a head suspension according to a related art.
Figure 27:
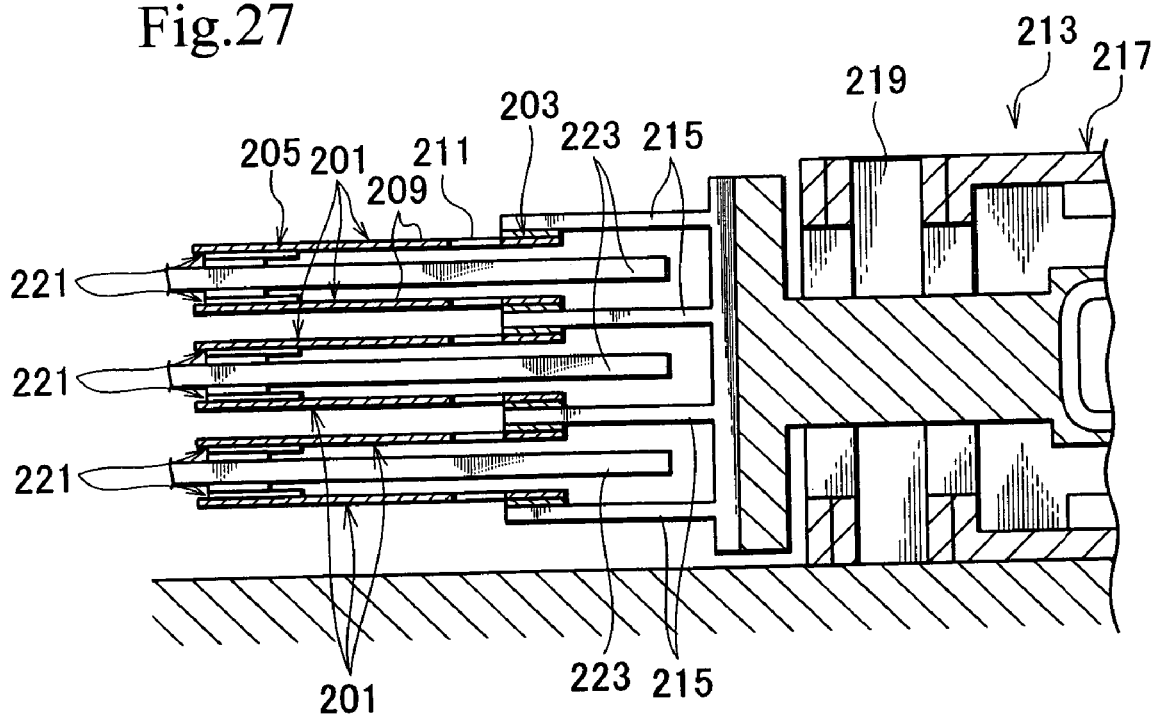
FIG. 27 is a sectional view partly showing an example of a hard disk drive in which the head suspension of FIG. 26 is arranged.

FIG. 25 is a graph showing the off-track property of a head suspension whose B1 frequency is 3.1 kHz. An abscissa indicates the frequency and an ordinate indicates off-track displacement. In the graph of FIG. 25, a curve depicted with a continuous line represents the off-track property of a head suspension measured on a 2.5-inch disk rotated at 5400 rpm and a curve depicted with a dotted line represents the off-track property of the head suspension measured on a 2.5-inch disk rotated at 7200 rpm.

In FIG. 25, the head suspension has a low B1 frequency of 3.1 kHz, and therefore, the bending mode of the head suspension overlaps the bending mode of the arm. As a result, an off-track phenomenon is observed at 3.0 kHz and at 3.3 kHz.

To avoid the off-track phenomenon, the B1 frequency of the load beam of the head suspension must be increased so that the bending mode of the head suspension will not overlap the bending mode of the arm.

The fourth embodiment improves the vertical stiffness (rigidity) of the load beam 3C, to increase the B1 frequency of the load beam 3C. This results in eliminating the overlapping of the bending modes of the head suspension 1C and arm 5 and reducing a bending amplitude. It is apparent from comparison between the fourth embodiment of FIG. 24 and the related art of FIG. 25 that the fourth embodiment causes no off-track error according to the bending mode of the head suspension 1C.

The fourth embodiment can provide effects similar to those of the first embodiment.

According to the fourth embodiment, the flexure 7C is fixed to the opposite-to-disk surface 31 of the arm 5. The flexure 7C includes the base layer 45C and the wiring patterns 47 arranged on the base layer 45C. The base layer 45C of the flexure 7C includes the resilient part 13C. This configuration reduces a step between the arm 5 and the load beam 3C, decreases the number of parts, simplifies the structure of the head suspension 1C, and makes the management and assembling of parts easier.

The flexure 7C can be easily attached to the arm 5 and can be apart from a disk because the wiring patterns 47 are arranged between the base layer 45C of the flexure 7C and the arm 5. This configuration prevents the wiring patterns 47 of the flexure 7C from being damaged in postprocesses.

The arm 5 is provided with the groove 33 to receive the wiring patterns 47 so that the flexure 7C on the arm 5 is separated away from a disk. This configuration prevents the wiring patterns 47 of the flexure 7C from being damaged during postprocesses as well as preventing the flexure 7C from protruding from the opposite-to-disk surface 31 of the arm 5, thereby contributing to thinning a hard disk drive.

The base layer 45C of the flexure 7C includes the resilient part 13C. The resilient part 13C extends over the joint part 83 to the body 82 of the rigid part 11C and is fixed to the rigid part 11C at least at two weld spots 85 along each side edge of the rigid part 11C. Without regard to the presence of the blanks 89 in the load beam 3C, this configuration can improve the vertical rigidity of the load beam 3C, increase the B1 frequency of the head suspension 1C, and satisfy a shock property required for the head suspension 1C.

According to the present invention, the disk-side surface of the arm is arranged within the total of the thicknesses of the rigid part and head. Whether or not the opposite-to-disk surface of the arm is arranged within the total of the thicknesses of the rigid part and head is optional.

According to the present invention, the rails formed along the side edges of the rigid part may be omitted, if not required.

What is claimed is:

1. A head suspension for a hard disk drive, comprising:
an arm to be attached to a carriage of the hard disk drive and turned around a spindle;
a load beam including a rigid part and a resilient part, to apply load onto a head that is arranged at a front end of the load beam to write and read data to and from a disk arranged in the hard disk drive, a base end of the rigid part being connected to the resilient part that is supported with the arm;
a flexure having read/write wiring patterns connected to the head, the flexure supporting the head and attached to a surface of the rigid part that is oriented toward the disk; and
a reinforcing rail formed along each side edge of the rigid part by box-bending the side edge toward the disk,
the flexure and the resilient part that are integral with or independent of each other being fixed to a surface of the arm that is oriented opposite to the disk, wherein:
the flexure includes the wiring patterns and a base layer on which the wiring patterns are formed;
the wiring patterns are arranged between the base layer of the flexure and the arm; and
the surface of the arm oriented opposite a side facing the disk includes a recess having a recess bottom extending parallel to the surface of the arm and forming a groove in the arm, and the flexure is disposed in the groove and contacting the recess bottom so as to dispose the wiring patterns within the groove.

2. The head suspension of claim 1, wherein:
the rigid part includes a body and a joint part that is in the vicinity of the base end of the rigid part; and
the resilient part that is a part of the base layer of the flexure extends over the joint part to the body of the rigid part and is fixed to each side edge of the rigid part at least at two spots.

3. A head suspension for supporting and applying a load to a read/write head for reading and writing data to a disk in a hard disk drive, comprising:
an arm to be attached to a carriage of the hard disk drive and turned around a spindle;
a load beam including a rigid part and a resilient part;
the rigid part having a base end connected to the resilient part, and having opposing side edges;
a flexure having read/write wiring patterns configured for connection to the head so as to support the head on a first flexure side of the flexure oriented to face the disk, the flexure having a second flexure side attached to a first rigid part surface of the rigid part that extends laterally and is oriented toward the disk;
the flexure and the resilient part being integral with or independent of each other, and the first flexure surface and the resilient part being fixed to an outward arm surface of the arm that is oriented facing away from the disk;
the flexure including a base layer on which the wiring patterns are formed;
the outward arm surface having a bottomed recess forming a groove having a groove bottom which extends parallel to a plane defined by said outward arm surface; and
the wiring patterns being disposed in the groove and between the base layer of the flexure and the groove bottom.

4. The head suspension of claim 3, wherein the base layer of the flexure includes a fixing tongue extending outward of the wiring patterns and fixed directly to the outward arm surface at positions adjacent the groove.

5. The head suspension of claim 4, wherein:
the resilient part includes a branch fixed to the outward arm surface of the arm at a position adjacent the flexure so as to not overlap the flexure in a direction normal to said outward arm surface;
the outward arm surface has a second bottomed recess forming a second groove having a second groove bottom which extends parallel to the plane defined by said outward arm surface; and
the branch is disposed in the second groove.

6. The head suspension of claim 5, wherein the groove and the second groove are configured such that the flexure and the branch do not protrude beyond the outward arm surface in a direction normal to the arm outward surface.

7. The head suspension of claim 6, wherein the rigid part includes reinforcing rails formed along each of said side edges of the rigid part by box-bending the rigid part in a direction toward the disk such that said flexure is disposed laterally between said reinforcing rails.

8. The head suspension of claim 4, wherein the rigid part includes reinforcing rails formed along each of said side edges of the rigid part by box-bending the rigid part in a direction toward the disk such that said flexure is disposed laterally between said reinforcing rails.

9. The head suspension of claim 3, wherein:
the resilient part includes a branch fixed to the outward arm surface of the arm at a position adjacent the flexure so as to not overlap the flexure in a direction normal to said outward arm surface;
the outward arm surface has a second bottomed recess forming a second groove having a second groove bottom which extends parallel to the plane defined by said outward arm surface; and
the branch is disposed in the second groove.

10. The head suspension of claim 9, wherein the groove and the second groove are configured such that the flexure and the branch do not protrude beyond the outward arm surface in a direction normal to the arm outward surface.

11. The head suspension of claim 10, wherein the rigid part includes reinforcing rails formed along each of said side edges of the rigid part by box-bending the rigid part in a direction toward the disk such that said flexure is disposed laterally between said reinforcing rails.

12. The head suspension of claim 9, wherein the rigid part includes reinforcing rails formed along each of said side edges of the rigid part by box-bending the rigid part in a direction toward the disk such that said flexure is disposed laterally between said reinforcing rails.

13. The head suspension of claim 3, wherein the rigid part includes reinforcing rails formed along each of said side edges of the rigid part by box-bending the rigid part in a direction toward the disk such that said flexure is disposed laterally between said reinforcing rails.

* * * * *